(12) United States Patent
Pallini, Jr. et al.

(10) Patent No.: US 7,549,682 B2
(45) Date of Patent: Jun. 23, 2009

(54) THREADED PIPE CONNECTOR

(75) Inventors: Joseph W. Pallini, Jr., Tomball, TX (US); Brian N. Munk, Houston, TX (US); Jesse B. Riha, Houston, TX (US); Rockford D. Lyle, Pinehurt, TX (US)

(73) Assignee: Vetco Gray Inc., Houston, TX (US)

( * ) Notice: Subject to any disclaimer, the term of this patent is extended or adjusted under 35 U.S.C. 154(b) by 346 days.

(21) Appl. No.: 11/229,905

(22) Filed: Sep. 19, 2005

(65) Prior Publication Data

US 2007/0063517 A1    Mar. 22, 2007

(51) Int. Cl.
*F16L 15/00* (2006.01)

(52) U.S. Cl. .................................. 285/390; 285/333

(58) Field of Classification Search ................ 285/333, 285/390, 334, 355
See application file for complete search history.

(56) References Cited

U.S. PATENT DOCUMENTS

| | | | | |
|---|---|---|---|---|
| 4,377,302 | A | | 3/1983 | Kohyama et al. |
| 4,582,348 | A | | 4/1986 | Dearden et al. |
| 4,600,225 | A | * | 7/1986 | Blose ........................... 285/334 |
| 4,629,221 | A | * | 12/1986 | Lumsden et al. ............. 285/328 |
| 4,822,081 | A | * | 4/1989 | Blose ........................... 285/334 |
| 4,846,508 | A | * | 7/1989 | Pallini, Jr. et al. ...... 285/148.19 |
| 6,155,613 | A | | 12/2000 | Quadflieg et al. |
| 6,254,146 | B1 | * | 7/2001 | Church ........................ 285/334 |
| 6,322,110 | B1 | * | 11/2001 | Banker et al. ................ 285/334 |
| 6,485,063 | B1 | * | 11/2002 | Olivier ........................ 285/333 |
| 6,712,401 | B2 | * | 3/2004 | Coulon et al. ................ 285/331 |
| 6,722,706 | B2 | * | 4/2004 | Church ........................ 285/334 |
| 6,976,711 | B2 | * | 12/2005 | Sivley, IV .................... 285/333 |

* cited by examiner

*Primary Examiner*—Aaron M Dunwoody
(74) *Attorney, Agent, or Firm*—Bracewell & Giuliani

(57) ABSTRACT

A riser connector uses a box and upset pin connector threadform design having S-shaped load flanks that provide a variable load angles depending on the radial position along the engaged teeth. This design promotes a load path that changes with position along the axial length of the engaged thread, as well as increasing or decreasing external loads on the connector. The connector also varies radial distention of the pin from the box in a manner that is different from one thread to the next. The threadform uses a combination of thread cuts that vary in shape, pitch, and/or thread cone angle to provide load and stab flanks, as well as a load path, that vary from one axial end of the engaged thread to the other.

31 Claims, 6 Drawing Sheets

THREADED PIPE CONNECTOR

BACKGROUND OF THE INVENTION

1. Technical Field

The present invention relates in general to threaded pipe connectors and, in particular, to a pipe connector designed for high fatigue such as offshore well riser connections.

2. Description of the Related Art

In some types of offshore oil and gas production, risers extend from the sea floor to a floating platform for processing and transferring the well fluid to a pipe line. Production risers may be thousands of feet in length and may extend in a long catenary curve from the platform to the subsea well assembly. These risers are subject to tensile loads, bending loads and fatigue due to current and waves. These risers may be in place for years, and a failure can be very expensive to repair.

Generally, there are two types of production riser connections that have been used to produce oil and gas from a subsea wellhead to a surface production tree on a floating offshore platform. Both types utilize a female member having an internal frustoconical circumferential surface provided with a thread, and a male member having an external correspondingly frustoconical circumferential surface and provided with an interfacing thread for engagement with the female member.

In the first type of production riser connection, a single thread is formed in a relatively thick walled, forged member for both the male and female members. These forged members are welded to sections of pipe. The thick wall allows for such features as a highly tapered threads, thread relief grooves, and final cross-sectional areas much greater than the pin. These features can greatly enhance both the static and fatigue strength of the connection. This type of connection also easily accommodates added features such as metal to metal seals and stab guides, both internal and external to the threaded surface. These features greatly enhance pressure integrity and operational characteristics, respectively.

The second type of commonly used production riser connector is referred to as a threaded and coupled connection. In this connection, the female member is threaded in each end of a short coupling sleeve made from either a thick-walled pipe or a forging. The male members typically consist of simply threading the ends of the pipe itself. This type of connection is lighter and less expensive than the one described above. It also eliminates the need for a weld between the connector and the pipe, which eliminates the restrictions on strength and fatigue that is associated with the weld.

Riser connectors of both types described above have a number of disadvantages. For the welded-on connection type, the connection is generally heavy and costly. It also must be welded onto the main pipe body, and therefore becomes limited by the weld itself. The welds are compatible with pipes of limited yield strengths. In addition, the fatigue life of the weld is substantially inferior, in most cases, to that of the connection itself. Therefore this type of connection is limited in both structural and fatigue strength by the pipe weld.

For the threaded and coupled connection, since the entire connection must be formed on the limited cross-section of the pipe, there are significant limits on what can be utilized for the same features that allow weld-on connectors to achieve high levels of performance. Past practices have also utilized thread and seal configurations that were developed for casing applications, where seal integrity from internal pressure and static strength were the main objectives. While connections of this type typically only have slightly limited structural strength, they have significantly reduced fatigue strength. They are also somewhat compromised in the ability to achieve reliable metal-to-metal seals external to the threaded section as well as achieve an effective stab guide in this same location. Thus, an improved threadform for high fatigue threaded and coupled connections would be desirable.

SUMMARY OF THE INVENTION

The connection of the present invention has threadforms in the box and on the pin that have load flanks that engage each other at different points along the length of the threadforms when fully made up. The varying engagement provides a load angle that varies along the length of the threadforms. The load flanks engage each other with varying amounts of interference, or radial distension, along the lengths of the threadforms when fully made up, so that when a tensile load is applied, the resultant sharing of the load throughout the threadforms is fairly uniform. Preferably, the load flanks in the central portion of the threadforms have greater interference when made up than the load flanks in the upper and lower portions. Also, in the preferred embodiment, the stab flanks of some of the threads in the upper portion and the lower portion of the threadforms engage each other with interference when the connector is fully made up.

In one embodiment, the box has an internal torque shoulder that is engaged with a torque shoulder formed on the pin. An internal metal seal member extends from the pin torque shoulder and engages a recess formed in the bore of the box. The connector may also have an external metal-to-metal seal comprising a seal member that protrudes from the upper end of the box and engages an outer diameter portion of the pin. Preferably, the box seal member has a recessed seal rib that is protected from damage during insertion of the pin into the box.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
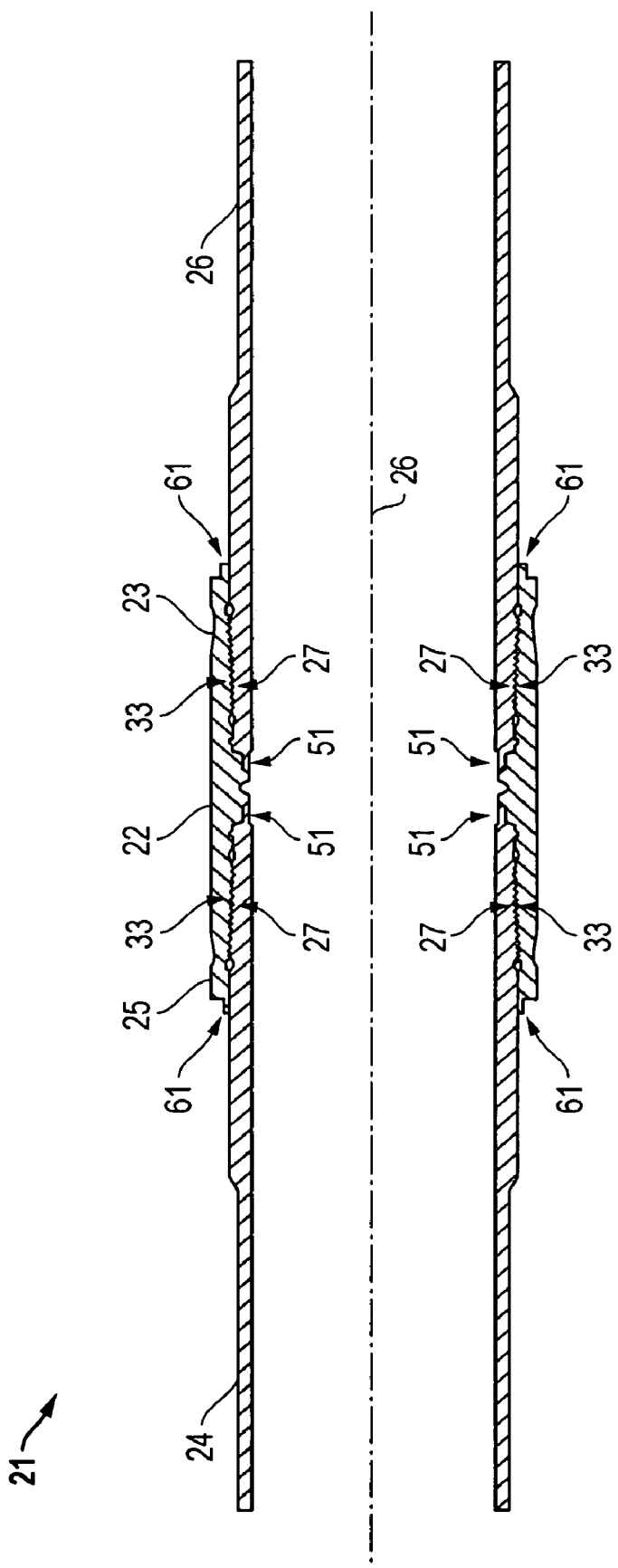
FIG. 1 is a sectional side view of one embodiment of a box and pin connection constructed in accordance with the present invention.

Referring to FIGS. 1-9, one embodiment of a pipe connector in accordance with this invention is illustrated as a threaded connection 21. Connection 21 may be used for a variety of purposes, but is particularly suitable for subsea oil and gas production with top tension and catenary risers. In this example, connection 21 comprises a coupling sleeve 22 having two box or female members 23, each for engaging a pin or male member 25. In this embodiment, pin 25 is shown integrally formed on an upset or enlarged ends of a pipe 24. The boxes 23 of coupling sleeve 22 join two pins 25 of two pipes 24. For some applications, each pipe 24 could have a pin 25 welded to or formed on one end and a box 23 welded to or formed on the opposite end. Pin 25 and box 23 have a common longitudinal axis 26 when connected.

Figure 2A:
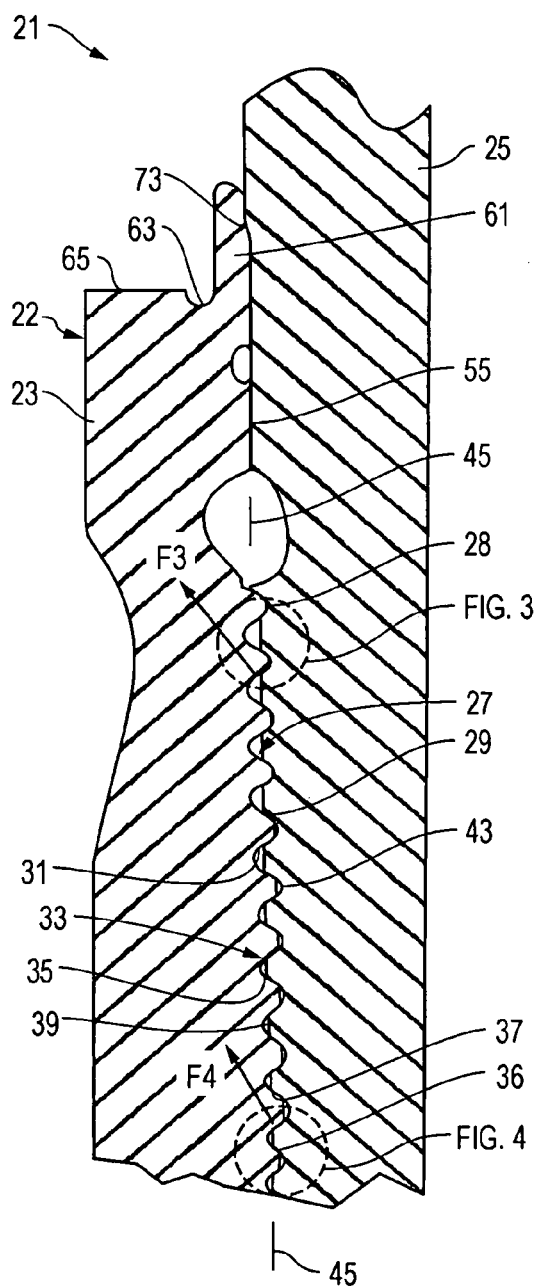
FIGS. 2A and 2B comprise an enlarged sectional side view of an interface of the connection of FIG. 1 and is constructed in accordance with the present invention.
Figure 2B:
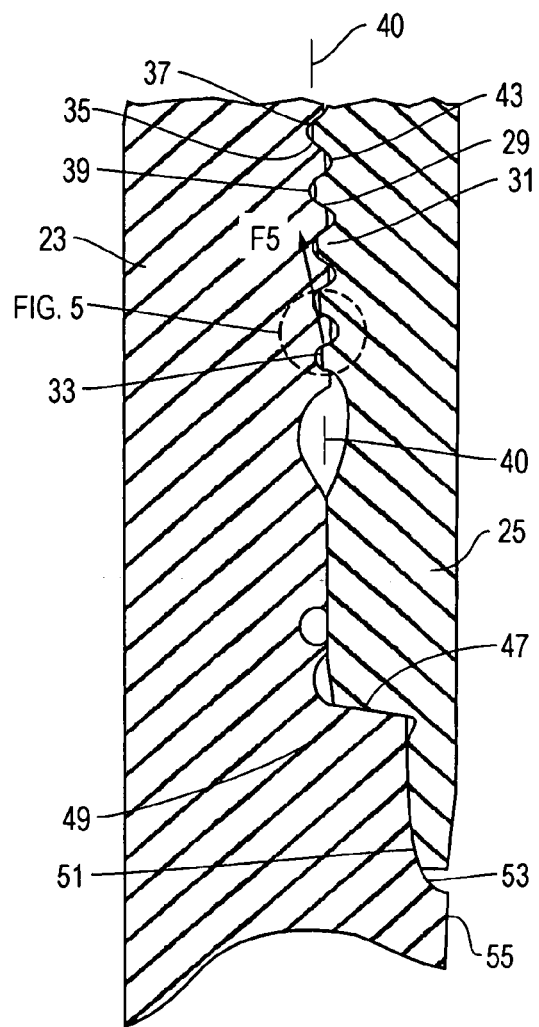

Referring to FIGS. 2A and 2B, box 23 has an internal threadform 27 (FIG. 2A, 2B) that is tapered, having a larger inner diameter at toward its rim or upper end and a smaller diameter at the lower end toward the nose of pin 25. The terms "upper" and "lower" are used for convenience only because the boxes 23 in coupling sleeve 22 are inverted from each other. "Upper" is used to mean toward the rim of box 23, and "lower" is used to mean toward the nose of pin 25. Each thread of box threadform 27 has a stab flank 29 (FIGS. 3-6) and an opposite facing load flank 31. For a particular thread, box stab flank 29 faces toward the rim or upper end of box 23 and load flank 31 faces the opposite direction.

The pin 25 has an external threadform 33 (FIG. 2A, 2B) that is threadingly engaged with the internal threadform 27 of the box 23. Each thread of pin 25 has a stab flank 35 (FIGS. 3-6) that faces opposite box stab flanks 29, and a load flank 37 that faces opposite box load flanks 31. When pin 25 inserts or stabs into box 23, prior to rotation, some of the stab flanks 29, 35 will engage each other. Rotation to full make-up causes the load flanks 31, 37 to engage each other, and in this embodiment, some of the stab flanks 29, 35 will engage each other. For convenience, the engaged threads of threadforms 27, 33 closest to the rim of box 23 will sometimes be referred to as uppermost threads 28. The lowermost engaged threads of threadforms 27, 33 will sometimes be referred to as lowermost threads 30 because they are the closest to the nose of pin 25.

The design of connection 21 has many unique features that are readily distinguished from the prior art. These features and embodiments may be utilized individually on the connection, or in any combination. For example, in one embodiment, at least some of the load flanks 31, 37 of both the box 23 and the pin 25 include an S-shaped cross-sectional profile that provides load angles that vary along the engaged thread to form a high fatigue coupled connection. This design promotes a load path that changes with position along the engaged thread, and with increasing or decreasing external loads on the connection 21. This design feature also varies radial distention or deflection of the pin 25 from the box 23 across an axial length of the threadforms 27, 33.

Figure 4:
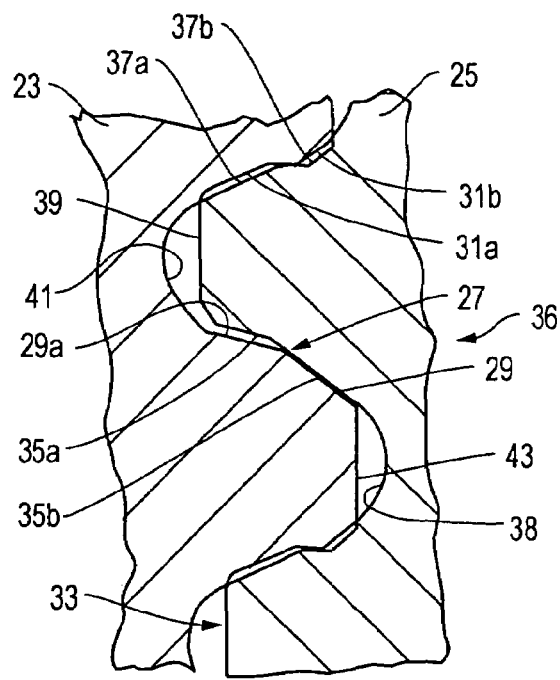
FIG. 4 is a further enlarged sectional side view of the threadform at a point illustrated by the circled dotted line in FIG. 2A near a center of the threadform.
Figure 6:
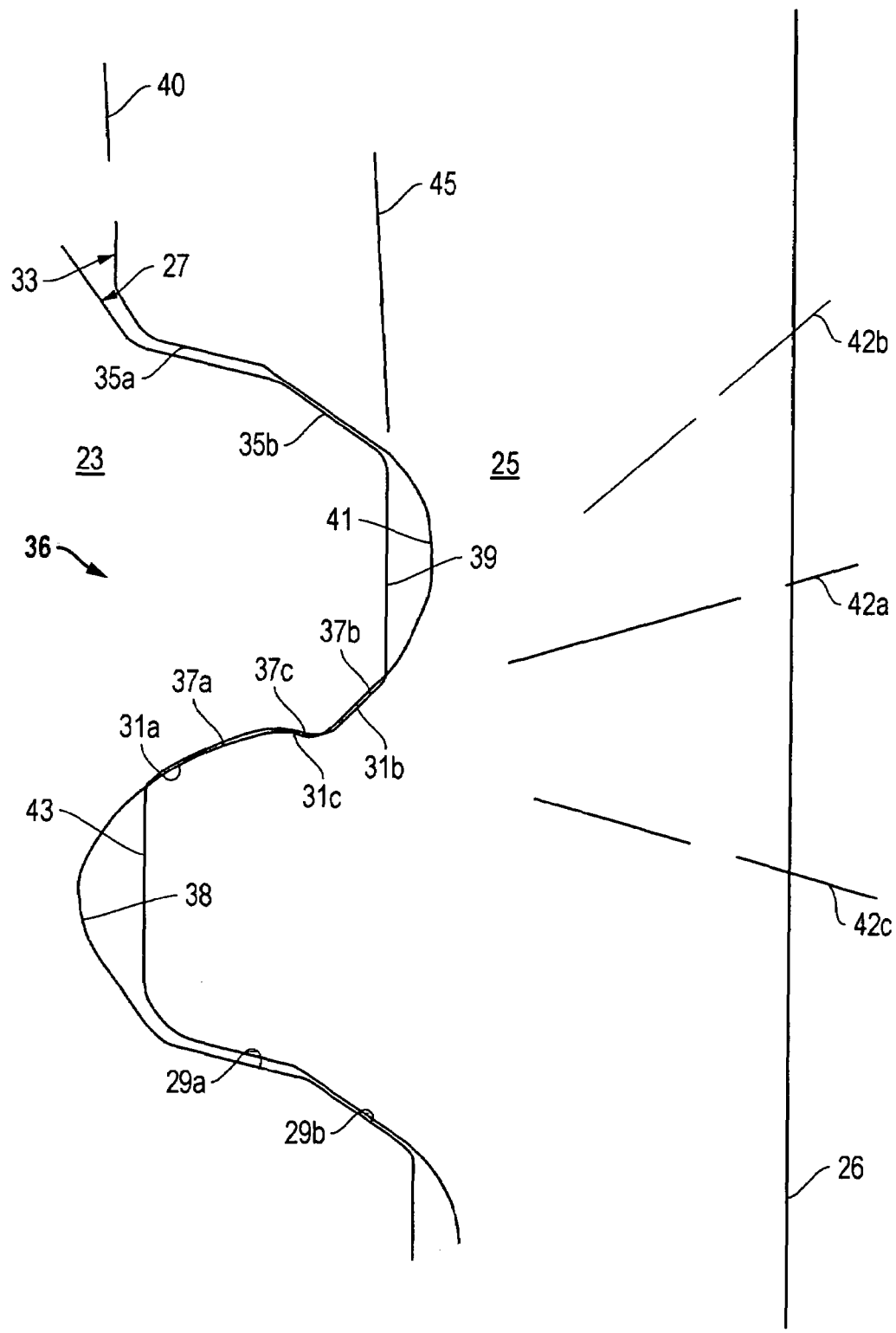
FIG. 6 is a still further enlarged sectional side view of a portion of the threadform as shown in FIG. 4.

FIG. 6 is a enlarged view of FIG. 4, which is one of the threads of box 23 and pin 25 at a generally central area between uppermost and lowermost threads 28, 30 (FIG. 2A, 2B). This engaged thread is sometimes referred to as the demarcation thread 36. Each of the threads of pin threadform 33 has a curved concave root 38 and a crest 39. In this embodiment crests 39 are cylindrical and concentric about the axis of pin 25, but this shape could vary. Crests 39 are at different distances from axis 26. A taper line 40 intersects a corner of each crest 39, line 40 being at a small angle relative to axis 26.

Furthermore, pin crests 39 have different radial dimensions or "heights" measured from the adjacent roots 38. As shown in FIG. 2A, an upper section of pin threadform 33 has pin crests 39 with reduced heights, beginning approximately with the demarcation thread 36 of FIGS. 4 and 6. In this example, the pin crests 39 of these upper threads gradually reduce in height from one thread to the next, with the shortest being at uppermost thread 28.

Each thread of box threadform 27 has a curved concave root 41 and a box crest 43. In this example, crests 43 are cylindrical, but some are at difference distances from axis 26. A box taper line 45 intersects a corner of each box crest 43 and is at an angle relative to axis 26. The lower portion of box threadform 27 may have box crests 43 that are approximately the same distance from axis 26. Beginning approximately the thread below the demarcation thread 36 shown in FIGS. 4 and 6, the remaining box crests 43 are along box taper line 45.

Box crests 43 also have different heights or radial dimensions, relative to box roots 41. As shown in FIG. 2B, a lower section of box threadform 27 has box crests 43 with reduced heights ending approximately with the demarcation thread 36 shown in FIGS. 4 and 6. The box threadform 27 from the demarcation thread 36 shown in FIGS. 4 and 6 upward may have crests 43 of generally uniform heights.

Referring FIGS. 4 and 6, in the central portion of pin threadform 33, each thread has a pin load flank 37 with two separate sections 37a, 37b formed at different angles. Pin load flank portion 37a is radially farther from axis 26 than pin load flank portion 37b. Outer load flank portion 37a joins pin crest 39, and inner load flank portion 37b joins pin root 38. Both load flank portions 37a, 37b are curved slightly in this example, rather than being flat facets, although flat facets would be feasible for some applications. A line normal to a midpoint of outer load flank portion 37a would incline less relative to the longitudinal axis 26 than to a midpoint of inner load flank portion 37b.

A transition area 37c is located between and joins inner and outer pin load flank portions 37a, 37b. Tangent lines 42a and 42b to any part of load flank portions 37a and 37b, respectively, would intersect axis 26 at a positive angle. Tangent line 42c of transition area 37c changes from positive, where it joins outer flank portion 37a, to perpendicular (not shown) to axis 26, to negative (shown in FIG. 6), and to back again to positive, where transition area 37c joins inner load flank portion 37b. The junction of outer load flank portion 37a with transition area 37c is at approximately the same axial position as where transition area 37c joins inner load flank portion 37b. Transition area 37c thus has an S-shaped contour, and because of the curvature of outer and inner load flank portions 37a, 37b, creates an S-shaped contour for the entire pin load flank 37.

Because of the truncation or reduced heights of some of the pin crests 39, not all of the pin threads have the same size and shape of load flank 37. In the upper portion of pin threadform 33, beginning approximately one thread above the demarcation thread 36 shown in FIGS. 4 and 6, the outer load flanks 37a shorten and in this example completely disappear for two or three threads, including uppermost thread 28. The uppermost two or three pin threads has only an inner load flank portion 37b. The outer pin load flank portions 37a gradually decrease in size in an upward direction from approximately the first thread above the demarcation thread 36 shown in FIGS. 4 and 6.

The demarcation thread 36 of box 23 in the central portion exemplified by FIGS. 4 and 6, has a mating outer load flank portion 31a and an inner load flank portion 31b that engage pin load flank portions 37a and 37b, respectively, in thread interference once fully made up. That is, some radial deflection or distension of the metal of load flank portions 31a, 31b and 37a and 37b occurs. A box transition area 31c joins inner and outer load flank portions 31a, 31b together. Transition area 31c has the same contour as pin transition area 37c, but transition areas 31c and 37c are spaced apart when the connection is fully made up, creating a gap, as shown in FIGS. 4 and 6. Tangent lines to box transition area 31c also intersect axis 26 at positive and negative angles.

Some of the box threads in this example do not have box load flank inner portions 31b. Because of the truncation of the heights of box crests 43 in the lower portion of box threadform 27, three or four of the lowermost box threads have only outer load flank portions 31a. The outer box load flank portions 31a gradually increase in size in an upward direction from box lowermost thread 30 to a point well below the demarcation thread 36 of FIGS. 4 and 6.

Figure 3:
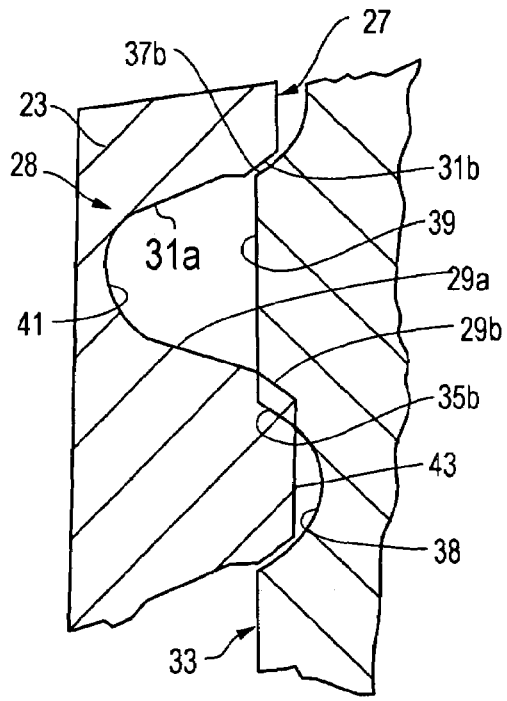
FIG. 3 is a further enlarged sectional side view of the threadform at a point illustrated by the circled dotted line in FIG. 2A near the upper end of the threadform.

When the connection is fully made up, pin load flank portions 37a, 37b engage box load flank portions 31a, 31b, respectively in the central portion, as illustrated by FIGS. 4 and 6. In the upper portion, as illustrated in FIG. 3, some of the threads will have only the inner load flank portions 31b, 37b engaging or even none at all. In the lower portion, illustrated by FIG. 5, some of the threads will have only the outer load flank portions 31a, 37a engaging each other or none at all. Furthermore, even though both pin load flank portions 37a, 37b and box load flank portions 31a, 31b engage each other in the central area, the engagement differs within the central area, depending on how much deflection occurs between the threads of pin 25 and box 23.

Figure 5:
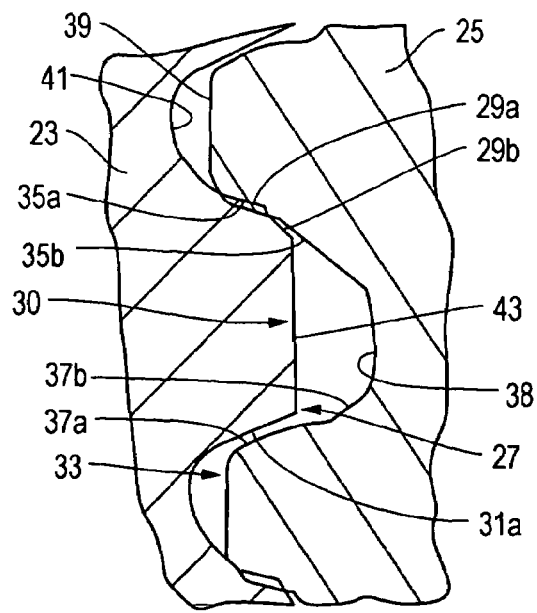
FIG. 5 is a further enlarged sectional side view of the threadform at a point illustrated by the circled dotted line in FIG. 2B at a lower portion of the threadform.

The load flank portions 31a, 31b, 37a, 37b engage each other at different points along the lengths of threadforms 27, 33 to vary the resultant force angles, illustrated by the lines F3, F4 and F5 of FIGS. 2A and 2B. Upper contact force F3 is the vector result of the contact forces at inner load flanks 31b, 37b at and near uppermost thread 28 when pin 25 and box 23 are fully made up and a tensile force applied. There is no pin outer load flank portion 37a at and near the uppermost thread 28, as shown in FIG. 3, so box outer load flank portion 31a in this upper portion is not in engagement with any part of pin threadform 33. Conversely, at and near the lowermost thread 30, resultant force F5 is the vector result of the contact forces at outer load flank portions 31a, 37a at full make up and under tensile load. There is no box inner load flank portion 31b at and near the lowermost thread 30, as shown in FIG. 5, so pin inner load flank portion 37b in this lower portion is not in engagement with any part of box threadform 27. In the central portion, the angle of contact force F4 under tensile load is vector resultant of both the outer load flank portions 31a, 37a and inner load flank portions 31b, 37b.

Referring still to FIGS. 2A and 2B, upper load angle F3 is at a greater angle to axis 26 (FIG. 1) than central load angle F4, and central load angle F4 is at a greater angle to axis 26 than lower load angle F5. The engagement between load flanks 31, 37 at full make-up and under tensile load has a lesser radial component in the lower portion (FIG. 5) than in the central portion (FIG. 4), and the central portion has a lesser radial component than the upper portion (FIG. 3). In the lower portion, the more axially oriented outer load flank portions 31a, 37a provide most or all of the contact force. In the upper portion, the more radially oriented inner load flank portions 31b, 37b provide most or all of the force. There is no bright line of demarcation between the lower, central and upper portions, as this will be a matter of design choice.

In addition to the difference in load paths F3, F4 and F5, the amount of thread interference between the various outer and inner load flank portions 31a, 37a and 31b, 37b varies. Thread interference is used herein to designate deflection that occurs between pin and box threadforms 33, 27 when fully made up but before any axial preload. Thread interference causes distension of the load flank portions 31a, 37a and 31b, 37b when fully made up, creating a preload force. In FIGS. 3-5, outlines of load flank portions 31a, 37a and 31b, 37b are superimposed over each other in the areas of thread interference. A greater overlap between the superimposed outlines indicates a greater amount of thread interference.

In the central portion, as illustrated by FIG. 4, both outer and inner load flank portions 31a, 37a and 31b, 37b engage each other in thread interference. The amount of load flank interference decreases from demarcation thread 36 in an upward direction. The amount of load flank interference also decreases from demarcation thread 36 downward. At the uppermost thread 28, as shown in FIG. 3, there is no thread interference between the inner load flank portions 31b, 37b. At the lowermost thread 30, illustrated by FIG. 5, there is no thread interference between the outer load flank portions 31a, 37a Pin stab flank 35 of the central area demarcation thread 36 shown in FIGS. 4 and 6 has two conical facets 35a, 35b in the example shown. Facets 35a, 35b join each other, with facet 35a being farther outward from axis 26 than facet 35b and at a lesser angle relative to axis 26. Similarly stab flank 29 of the box demarcation thread 36 shown in FIGS. 4 and 6 has two facets 29a, 29b that are at the same angles and mate with pin facets 35a, 35b. In the example shown, when made up but before axial preload, outer stab flank facets 29a, 35a are spaced apart from each other by a gap, but inner stab flank facets 29b, 35b may contact each other at demarcation thread 36.

In the upper portion of pin threadform 33, as illustrated by FIG. 3, the reduced height of pin crests 33 causes pin outer stab facets 35a to gradually disappear in an upward direction. The box threads in the upper portion of threadform 27 have both inner and outer stab flank facets 29a, 29b. The engagement of stab flanks 29, 35 in the upper portion decreases in an upward direction, with only stab flank inner portions 29b, 35b engaging each other at uppermost thread 28.

In the lower portion of box threadform 33, as illustrated by FIG. 5, the reduced heights of box crests 43 causes box inner stab flank portions 29b to become smaller and gradually disappear. The engagement of stab flanks 29, 35 in the lower portion thus decreases in a downward direction, with only stab flank outer portions 29a, 35a engaging each other at lowermost thread 30 at full make up and before any axial preload.

In this example, a certain amount of thread interference also exists between stab flanks 29, 35 of some of the threads at full make up of the connection and before any axial preload. The amount of stab flank 29, 35 interference increases gradually in an upward direction, beginning a few threads above demarcation thread 36 shown in FIGS. 4 and 6. FIG. 3 shows a significant amount of thread interference between inner stab flank portions 29b, 35b of uppermost thread 28. The amount of stab flank 29, 35 interference gradually increases in a downward direction, beginning a few threads below demarcation thread 36 shown in FIGS. 4 and 6. Lowermost thread 30, exemplified by FIG. 5, shows a significant amount of thread interference between stab flank outer portions 29a, 35a at full make up and before any axial preload. In this example, there are no threads that engage each other with both thread interference on their stab flanks 29, 35 and load flanks 31, 37, although such could occur.

Referring to FIG. 2B, box 23 has an internal torque shoulder 47 in its bore 55 below lowermost thread 30. Pin 25 has an external torque shoulder 49 that contacts torque shoulder 47. Sufficient tightening of connection 21 after contact of shoulders 47, 49 causes deflection of shoulders 47, 49, creating an axial preload force. Torque shoulders 47, 49 may be flat or slightly conical as shown in FIG. 2B. The thread interference between load flanks 31, 37 and stab flanks 29, 35 shown in FIGS. 3-6 occurs before any axial preload. Axial preload causes the contact forces at the load flanks 31, 37 to increase and the contact forces at the stab flanks 29, 35 to decrease. Some of the stab flanks 29, 35 in the upper and lower portions of threadforms 27, 33 will shift from stab flank contact to load flank contact when sufficient axial preload is applied.

Figure 7:
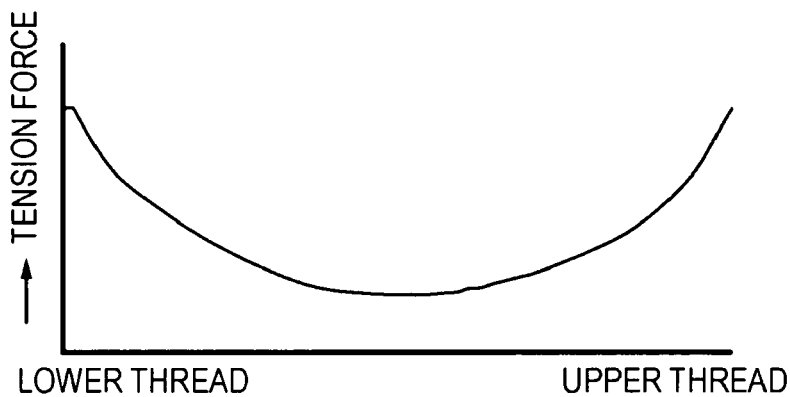
FIG. 7 is a graph of a prior art example of a thread load distribution along the length of the engaged thread while undergoing a tensile load.
Figure 8:
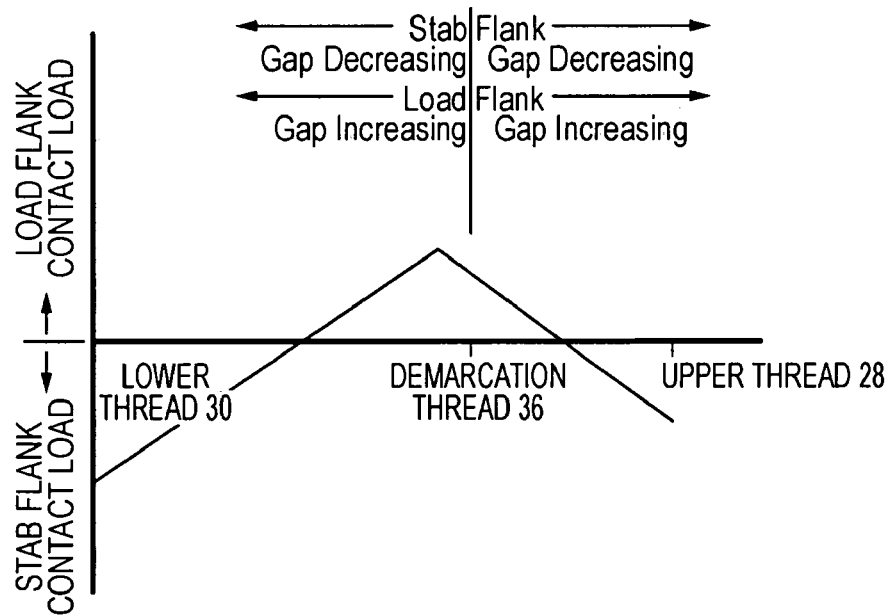
FIG. 8 is an idealized graph of a thread load distribution of a connection in accordance with the invention along the length of the engaged thread after full makeup, but not under a tensile load.
Figure 9:
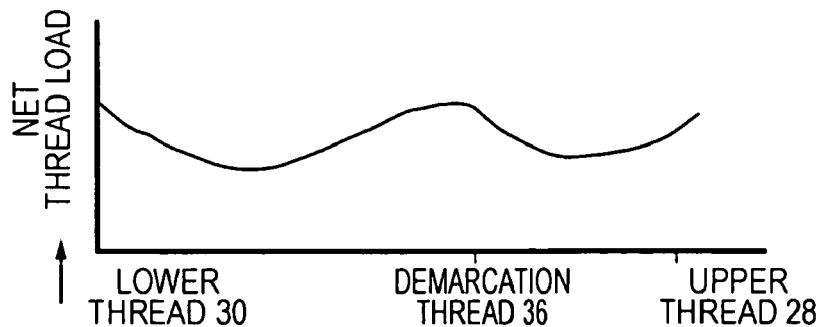
FIG. 9 is a an idealized graph of the connection of FIG. 8 while undergoing a tensile load.

The reason for the change in configuration of the threads along the threadform lengths is illustrated in FIGS. 7-9. FIG. 7 illustrates a tensile load being applied to a threadform without considering any preload force due to thread interference. Ideally, if a 16,000 pound tensile force is applied and the connection has 16 threads, each thread would experience 1000 pounds of force. However, the tension does not uniformly pass through the threads. Even if the connection has axial torque shoulders that enable a preload, the highest forces will be at the opposite ends of the threadforms. The net force between threads measured at any point along the length of the threadform will gradually drop in a central area. Thus the central portions of threadforms in general carry the least portion of the tensile load, and the upper and lower portions the greater portion of the tensile load.

FIG. 8 illustrates in idealized form contact forces between threads that exist along the threadforms 27, 33 in accordance with this invention when fully made up, but without any axial preload due to engagement of torque shoulders 47, 49 (FIG. 2B) and without being pulled in tension from external loads. The threads in the positive area of the graph of FIG. 8 have net load flank 31, 37 preload forces, while the threads in the negative areas of the graph illustrate net stab flank preload forces. The preload of the stab flanks 29, 35 results from the inward movement of pin 25 into box 23 during make up being resisted by the interference of stab flanks 29, 35. This resistance tends to cause pin 25 to be pushed out of box 23, but this outward movement is resisted by load flanks 31, 37, thus deflecting and preloading them. The preload forces due to interference between stab flanks 29, 35 are opposite in direction to the preload forces due to interference between load flanks 31, 37.

When fully made up, torque shoulders 47, 49 (FIG. 2) will be tightened to a desired preload force. Even without torque shoulders 47, 49, because of the various thread interferences, preload forces as in FIG. 8 will exist when fully made up. The axial preload force caused by the axial deflection of torque shoulders 47, 49 (FIG. 2) does not substantially change the shape of the graph of FIG. 8, rather it mainly shifts it upward and somewhat flattens it out. Increasing the axial preload by deflecting torque shoulders 47, 49 decreases the amount of thread preload of stab flanks 29, 35 and increases the amount of thread preload of load flanks 31, 37.

FIG. 9 is an idealized example of the contact forces occurring on each thread when an external tensile load is applied to the pin having the threadform graph of FIG. 8. The demarcation thread 36, illustrated in FIGS. 4 and 6, experiences the maximum load flank preload according to FIG. 8. As an external tensile load is applied, the load distribution among load flanks of the threads takes the shape of FIG. 7. When added to the existing load distribution shown in FIG. 8 from internal preload, the distribution of load on thread load flanks 31, 37 takes the shape of FIG. 9. The demarcation thread 36 of FIGS. 4 and 6 will share a net load portion of the tensile load applied to pin 25 equal to the preload at the peak of the graph of FIG. 8 plus the external tensile load that exists at that point.

The uppermost and lowermost threads 28, 30, and those near them have a net preload force due to stab flank 29, 35 interference, even after axial preload. When pin 25 is under a tensile load, the tensile load lifts the interfering pin stab flanks 35 from the box stab flanks 29 and moves the load flanks 31, 37 of those threads into contact with each other. The resultant contact force on threads 28, 30 equals the tensile load being applied plus the stab flank preload, which is negative, thus it subtracts. If sufficient tensile load is applied, the net thread load on the uppermost and lowermost threads 28, 30 becomes positive because the external load initiates contact of their load flanks 31, 37. The contact forces on the uppermost and lowermost threads 28, 30 is less than the high level that would exist in the prior art shown by FIG. 3 because of the subtraction of the stab flank preload forces. Typically, the net load on the threads between lowermost thread 30 and demarcation thread 36 is somewhat less than the net loads at lowermost thread 30 and demarcation thread 36. Similarly, the net load between demarcation thread 36 and uppermost thread 28 is typically less.

Still another design feature of the present invention deals with an internal seal 51 (FIG. 2B). Seal 51 is a metal-to-metal seal in pin 25 that engages a recess 53 in bore 55 of box 23. Seal 51 has a smaller cross-section thickness than pin 25 at torque shoulder 49 and depends from torque shoulder 49. The free end of seal 51 does not contact any shoulder within box bore 55. Thus, the internal seal 51 is non-shouldering and metal-to-metal between the box 23 and the pin 25. The free end of seal 51 defines the lowermost end or nose of pin 25.

Yet another design feature of the present invention deals with an external seal 61 (FIGS. 2A, 10 and 11) on box 23. Seal member 61 has similarities to internal seal 51. A shoulder 65 is formed near the upper end of box 23. Seal member 61 has a nearly flush inner diameter with bore 55 of box 23 and an outer diameter less than box 23 at shoulder 65. Seal member 61 thus has a thinner cross-section than box 23 at shoulder 65, extends axially past shoulder 65, and defines the rim of box 23. The free end of seal member 61 is the uppermost point of box 23. Seal member 61 engages an outer diameter portion of pin 25 to form a metal-to-metal seal. A relief groove 63 may exist at the junction of shoulder 65 with seal member 61 to increase the flexibility of seal member 61. Shoulder 65 is shown flat, but it could be conical or tapered.

Figure 10:
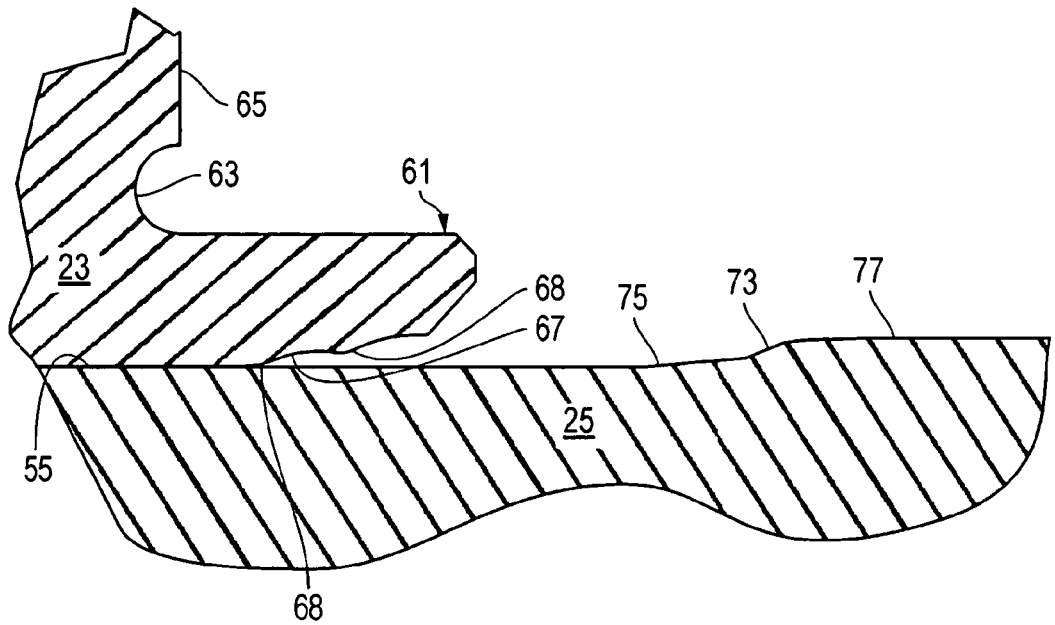
FIG. 10 is an enlarged sectional view of an external metal seal on the box constructed in accordance with the present invention, and shown with the pin being inserted into the box.
Figure 11:
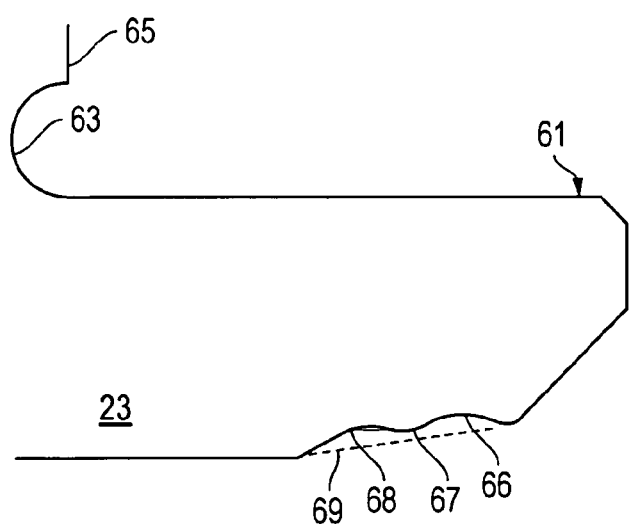
FIG. 11 is a further enlarged sectional view of the external metal seal on the box of FIG. 10, with certain features exaggerated for clarity.

Referring now to FIGS. 10 and 11, in the preferred embodiment, seal member 61 has a rounded, annular sealing rib 67 on its inner diameter. Sealing rib 67 is convex and protrudes inwardly toward axis 26 (FIG. 1). A concave, curved recess 66 is joins and extends upward from sealing rib 67, and a concave, curved recess 68 joins and extends downward below sealing rib 67. Recesses 66, 68 have depths sufficient so that sealing rib 67 is recessed from an imaginary conical surface 69 extending in a straight line from the lower edge of lower recess 66 to the upper edge of upper recess 68. The minimum inner diameter of sealing rib 67 is larger than the diameter of imaginary conical 68 at the same axial point to prevent threadform 33 (FIG. 2A) of pin 25 from striking and damaging sealing rib 67 during insertion of pin 25 into box 23.

Pin 25 has a tapered sealing surface 73 on its outer diameter that is engaged in metal to metal sealing engagement with box sealing rib 67 when box 23 and pin 25 are made up. FIG. 10 shows pin 25 partially inserted into box 23. Pin sealing surface 73 may be slightly rounded and is located between cylindrical surfaces 75 and 77 on the outer diameter of pin 25.

Figure 12:
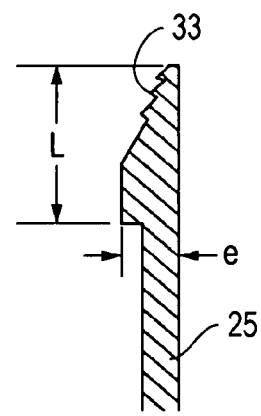
FIG. 12 is a schematic, reduced, sectional view diagram of a pin constructed in accordance with the present invention.

Another feature of the present invention is schematically shown in FIG. 12. Pin 25 is upset at the axial end, including an axial upset length "L" and a radial upset dimension "e", such that an aspect ratio L/e≧30. In one embodiment, the pin 25 is upset with the radial dimension of approximately 0.25 inches. Also, preferably the length of the threadforms 27, 33 is no more than two-thirds the length L.

The present invention has several advantages, including high fatigue resistance and low torque for make-up. The strength of the connection exceeds that of the components. The stress amplification factor (SAF) is lower than prior art designs. The box design features include external and internal primary metal seals and a load shoulder to provide a majority of the preload. The thread design features include a threadform optimized for strength and fatigue, and threads that assist with all loading conditions while performing better under bending loads. The distribution of loading between the threads along the axial length of the thread during preload and subsequently applied axial loads can be tailored for many different applications. This design also provides compressive preload, bending resistance, or socket action in a specific region of the thread, although not necessarily the entire thread. The connector also has improved static strength, fatigue life, and functional make-up of the connection.

The present invention is well suited for many applications including, for example, 9.75 to 16 inch OD pin with a wall thickness in the range of 0.375 inches to over 1 inch. The pins only require a slight upset (approximately 0.25 inches), and have no welds. In one embodiment, approximately 14 to 16 threads are used on approximately a 2° taper. This design may be used in many different applications, such as multiple flow line applications like production risers, export risers, import risers, steel catenary risers (SCR), etc.

While the invention has been shown or described in only some of its forms, it should be apparent to those skilled in the art that it is not so limited, but is susceptible to various changes without departing from the scope of the invention.

The invention claimed is:

1. A pipe connector, comprising:
   a box having internal threads;
   a pin having external threads engaged with the internal threads of the box, the threads of the pin and box having stab flanks and load flanks; and
   the load flanks of a central portion of the threads of the pin and box engaging each other with greater interference than the load flanks of the threads of the pin and box that engage each other proximate to a rim of the box and the load flanks of the threads of the pin and box that engage each other proximate to a rim of the pin.

2. The connector according to claim 1, wherein the engagement of the load flanks of the central portion of the threads of the pin and box creates load paths with angles relative to an axis of the connector that differ from load paths created by the engagement of the load flanks of the pin and box threads proximate to the rim of the box and proximate to the rim of the pin.

3. The connector according to claim 1, wherein the engagement of the load flanks of the threads of the pin and box creates load paths with angles relative to an axis of the connector that change gradually from one end of the threads to the other end of the threads of the pin and box.

4. The connector according to claim 1, wherein:
   the load flanks of the threads proximate to the rim of the pin, central portion, and proximate to the rim of the box create load paths with angles relative to an axis of the connector; and
   the angles of the load paths of the threads proximate to the rim of the pin are less than the angles of the load paths of the threads in the central portion, and the angles of the load paths of the threads in the central portion are less than the angles of the load paths of the threads proximate to the rim of the box.

5. The connector according to claim 1, wherein:
   the interference of the load flanks of the threads of the box and pin decreases in an upward direction from the threads of the central portion to the threads proximate to the rim of the box; and
   the interference of the load flanks of the threads of the box and pin decreases in a downward direction from the threads of the central portion to the threads proximate to the rim of the pin.

6. The connector according to claim 1, wherein:
   the interference of the stab flanks of the threads of the box and pin increases in an upward direction from the threads of the central portion to the threads proximate to the rim of the box; and
   the interference of the stab flanks of the threads of the box and pin increases in a downward direction from the threads of the central portion to the threads proximate to the rim of the pin.

7. The connector according to claim 1, wherein:
   each of the load flanks of the central portion of the threads of the pin comprises an outer portion and an inner portion that are joined to each other by a transition area that extends slightly downward from its junction with the outer portion to its junction with the inner portion.

8. The connector according to claim 1, wherein:
   each of the load flanks of the central portion of the threads of the pin comprises a curved, convex outer portion and a curved, concave inner portion that are joined to each other by a transition area; a line tangent to a junction of the outer portion with the transition area extends in an upward and inward direction to an intersection with an axis of the connector; and
   a line tangent to a junction of the inner portion with the transition area extends in a downward and inward direction to an intersection with the axis of the connector.

9. The connector according to claim 1, wherein
   at least some of the load flanks of the threads of the box and pin proximate to the rim of the box are non-interfering with each other and at least some of the stab flanks of the threads of the box and pin proximate to the rim of the box interferingly engage each other when the connector is fully made up.

10. The connector according to claim 1, wherein in the lower portion of the threads:
at least some of the load flanks of the threads of the box and pin proximate to the rim of the rim of the pin are non-interfering with each other and at least some of the stab flanks of the threads of the box and pin proximate to the rim of the pin interferingly engage each other when the connector is fully made up.

11. A pipe connector, comprising:
a box having an internal threadform;
a pin having an external threadform in a thread interference engagement with the internal threadform of the box when the connector is fully made up; and
each of the threadforms having at least some threads differing in shape and engaging each other at different points from other of the threads, wherein the differing shapes create a greater amount of net load flank preload in a central portion of the threadforms than in end portions of the threadforms.

12. The connector according to claim 11, wherein the differing shapes create load paths that have angles relative to an axis of the connector that differ along the lengths of the threadforms.

13. The connector according to claim 11, wherein:
at least some of the threads of the pin have load flanks that comprise a curved, convex outer portion and a curved, concave inner portion that are joined to each other by a transition area; and
a first line tangent to the transition area extends in an upward and inward direction to an intersection with an axis of the connector, a second line tangent to the transition area extends in a downward and inward direction to an intersection with the axis of the connector, and a third line tangent to the transition area extends in an upward and inward direction to an intersection with the axis of the connector.

14. The connector according to claim 11, wherein:
at least some of the threads of the box and pin have load flanks that are non interfering with each other and at least some other of the threads of the box and pin have load flanks that interferingly engage each other when the connector is fully made up.

15. The connector according to claim 11, wherein:
at least some of the threads of the box and pin have stab flanks that are non interfering with each other and at least some other of the threads of the box and pm have stab flanks that interferingly engage each other when the connector is fully made up.

16. A pipe connector, comprising:
a box having an internal threadform with a plurality of box threads separated from each other by a root, the distance between each of the box threads being at a selected pitch, each of the box threads having a load flank and a stab flank separated by a crest;
a pin having an external threadform with a plurality of pin threads separated from each other by a root, each of the pin threads having a load flank and a stab flank separated by a crest; the pin threads in a first portion of the threadforms having crests of reduced height compared to the pin threads in a second portion and a third portion of the threadforms;
the load flanks of the pin threads in the second and third portions having a convex portion that joins the crest and a concave portion that joins the root, the convex and concave portions being joined to each other by an S-shaped transition area;
the load flanks of at least some of the pin threads in the first portion having a concave portion joining the crest and lacking a convex portion and transition area, at least some of the box threads in the third portion having crests of reduced height compared to the box threads in the first and second portions;
the load flanks of the box threads in the first and second portions having a convex portion that joins the crest and a concave portion that joins the root, the convex and concave portions being joined to each other by an S-shaped transition area;
the load flanks of at least some of the box threads in the third portion having a concave portion joining the crest and lacking a convex portion and transition area; and wherein
when the connector is fully made up, in the first portion, convex portions of the load flanks of at least some of the box threads mate with concave portions of the load flanks of at least some of the pin threads, in the second portion, convex and concave portions of the load flanks of at least some of the box threads mate with concave and convex portions, respectively, of the load flanks of at least some of the pin threads, and in the third portion, concave portions of the load flanks of at least some of the box threads mate with convex portions of the load flanks of at least some of the pin threads.

17. The connector according to claim 16, wherein the first portion is closer to a rim of the box than the second portion, and the second portion is closer to the rim of the box than the third portion.

18. The connector according to claim 16, wherein when the connector is fully made up, the stab flanks of at least some of the pin and box threads in the first and second portions engage each other, and at least some of the stab flanks of the pin and box threads spaced apart from each other by gaps.

19. A pipe connector, comprising:
a box having an internal threadform, an internal torque shoulder spaced in a first direction from the internal threadform, and an annular recess extending in the first direction from the internal torque shoulder;
a pin having an external threadform threadingly engaged with the internal threadform of the box and a pin torque shoulder spaced in the first direction from the external threadform, the external torque shoulder engaging the internal torque shoulder when the connector is fully made up; and
a pin seal member on the pin that extends in the first direction from the external torque shoulder and engages the recess in a metal-to-metal sealing engagement.

20. The connector according to claim 19, wherein the pin seal member has a free end that protrudes in the first direction farther than any other portion of the pin.

21. The connector according to claim 19, further comprising:
a rim on the box member that is spaced in a second direction from the internal threadform;
a box seal member protruding from the rim in the second direction and sealing against an outer diameter portion of the pin in a metal-to-metal sealing engagement.

22. The connector according to claim 21, wherein the box seal member comprises: a convex seal rib joined by upper and lower concave recesses above and below the seal rib, the seal rib being spaced radially outward of an imaginary conical surface that extends from a lower edge of the lower concave recess to an upper edge of the upper concave recess.

23. A pipe connector, comprising:
a box having an internal threadform;
a pin having an external threadform threadingly engaged with the internal threadform of the box, the pin having a metal-to-metal sealing surface on an outer diameter portion of the pin;
a box seal member on the box, the box seal member having a convex seal rib that seals in metal-to-metal engagement with the sealing surface on the pin when the box and pin are made up; and
the box seal member having upper and lower concave recesses above and below the seal rib, the seal rib being spaced radially outward of an imaginary conical surface that extends from a lower edge of the lower concave recess to an upper edge of the upper concave recess.

24. The pipe connector according to claim 23, wherein the seal rib has a minimum inner diameter that is larger than a diameter of the imaginary conical surface at a point on the imaginary conical surface closest to the seal rib.

25. The pipe connector according to claim 23, wherein the box seal member has a free upper edge that defines an uppermost point on the box.

26. A pipe connector, comprising:
a box having an internal threadform and an internal torque shoulder spaced in a first direction from the internal threadform;
a pin having an external threadform threadingly engaged with the internal threadform of the box and an external torque shoulder spaced in the first direction from the external threadform, the external torque shoulder engaging the internal torque shoulder when the connector is fully made up; and
the box having a rim spaced in a second direction from the internal threadform, the rim comprising a box seal member that engages an outer diameter portion of the pin in a metal-to-metal sealing engagement.

27. The connector according to claim 26, wherein:
the box has an external shoulder of selected wall thickness and spaced in the second direction from the internal threadform; and
the box seal member extends from the external shoulder in the second direction and has lesser wall thickness than the box at an outer diameter of the external shoulder.

28. The connector according to claim 26, wherein the box seal member has a free end that protrudes in the second direction farther than any other portion of the box.

29. The connector according to claim 26, wherein the box seal member comprises:
a convex seal rib joined by upper and lower concave recesses above and below the seal rib, the seal rib being spaced radially outward of an imaginary conical surface that extends from a lower edge of the lower concave recess to an upper edge of the upper concave recess.

30. A pipe connector, comprising:
a box having an internal threadform;
a pin having an external threadform threadingly engaged with the internal threadform of the box; and the pin has threads cut on an axial end thereof, and is upset at the axial end including an axial upset length "L" and a radial upset dimension "e", such that an aspect ratio L/e, such that an aspect ratio $L/e \geqq 30$.

31. The connector according to claim 30, wherein the threadform has an axial length that is substantially no more than two thirds the axial upset length L.

* * * * *